US011891219B2

(12) United States Patent
Jordan

(10) Patent No.: US 11,891,219 B2
(45) **Date of Patent: *Feb. 6, 2024**

(54) MULTI-CHAMBERED LID APPARATUS

(71) Applicant: Cepheid, Sunnyvale, CA (US)

(72) Inventor: Paul Jordan, Millbrae, CA (US)

(73) Assignee: Cepheid, Sunnyvale, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/342,370

(22) Filed: Jun. 8, 2021

(65) Prior Publication Data

US 2021/0362918 A1 Nov. 25, 2021

Related U.S. Application Data

(63) Continuation of application No. 16/356,845, filed on Mar. 18, 2019, now Pat. No. 11,053,053, which is a continuation of application No. 15/207,638, filed on Jul. 12, 2016, now Pat. No. 10,273,062, which is a continuation of application No. 14/214,668, filed on Mar. 15, 2014, now Pat. No. 9,394,086.

(60) Provisional application No. 61/791,696, filed on Mar. 15, 2013.

(51) Int. Cl.

| | |
|---|---|
| ***B65D 47/08*** | (2006.01) |
| ***B65D 47/00*** | (2006.01) |
| ***B65D 51/18*** | (2006.01) |
| ***B01L 3/00*** | (2006.01) |
| ***B65D 25/04*** | (2006.01) |
| ***B65D 43/02*** | (2006.01) |

(52) U.S. Cl.

CPC ...... *B65D 47/0857* (2013.01); *B01L 3/50853* (2013.01); *B65D 25/04* (2013.01); *B65D 43/0204* (2013.01); *B65D 47/00* (2013.01); *B65D 51/18* (2013.01); *B01L 2300/043* (2013.01)

(58) Field of Classification Search

CPC ........... B01L 3/50853; B01L 2300/043; B65D 51/18; B65D 43/0204; B65D 25/04; B65D 47/00; B65D 47/0857

USPC .......................................................... 220/553

See application file for complete search history.

(56) References Cited

U.S. PATENT DOCUMENTS

| | | | |
|---|---|---|---|
| 4,046,288 | A | 9/1977 | Bergman et al. |
| 4,717,042 | A | 1/1988 | McLaughlin et al. |
| 5,219,100 | A | 6/1993 | Beck et al. |
| D339,065 | S | 9/1993 | Forsyth et al. |
| D340,187 | S | 10/1993 | Forsyth |

(Continued)

FOREIGN PATENT DOCUMENTS

| | | |
|---|---|---|
| DE | 102006001881 | 7/2007 |
| WO | 2004085272 | 10/2004 |

(Continued)

OTHER PUBLICATIONS

International Search Report and Written Opinion dated Jul. 24, 2014 in PCT/US2014/029865 (10 pages).

*Primary Examiner* — James N Smalley
*Assistant Examiner* — Madison L Poos
(74) *Attorney, Agent, or Firm* — Kilpatrick Townsend & Stockton LLP

(57) ABSTRACT

A lid apparatus for a multi-chambered container. The lid apparatus has a top-lid that is hingedly attached to a bottom-cap. The top-lid includes one or more openings for fluid filling multiple passages that extend from the bottom-cap. A lower bottom-cap includes welding features for welding to the multi-chambered container.

25 Claims, 8 Drawing Sheets

(56) References Cited

U.S. PATENT DOCUMENTS

| | | | |
|---|---|---|---|
| 5,441,163 | A | 8/1995 | Carrasco et al. |
| 6,637,628 | B2 | 10/2003 | Hoeser |
| D565,407 | S | 4/2008 | Kick |
| D582,271 | S | 12/2008 | Vogel et al. |
| 7,909,212 | B2 | 3/2011 | Parve et al. |
| 7,913,868 | B2 | 3/2011 | Dolan et al. |
| 8,100,303 | B2 | 1/2012 | Parve et al. |
| 9,394,086 | B2 | 7/2016 | Jordan |
| 2003/0044324 | A1 | 3/2003 | Micklash, II et al. |
| 2006/0169708 | A1 | 8/2006 | Chang et al. |
| 2007/0228079 | A1 | 10/2007 | Vogel et al. |
| 2007/0295762 | A1 | 12/2007 | Zeitlin et al. |
| 2008/0090287 | A1 | 4/2008 | Larsen et al. |
| 2008/0116204 | A1 | 5/2008 | Ohse et al. |
| 2009/0173682 | A1 | 7/2009 | Robinson et al. |
| 2010/0230446 | A1 | 9/2010 | Daggett et al. |
| 2011/0170807 | A1 | 7/2011 | Khubani et al. |
| 2011/0212002 | A1 | 9/2011 | Curry et al. |
| 2014/0284338 | A1 | 9/2014 | Jordan |

FOREIGN PATENT DOCUMENTS

| | | |
|---|---|---|
| WO | 2012033439 | 3/2012 |
| WO | 2014145151 | 9/2014 |

MULTI-CHAMBERED LID APPARATUS

CROSS-REFERENCES TO RELATED APPLICATIONS

This application is a Continuation of U.S. application Ser. No. 16/356,845, filed Mar. 18, 2019, which is a Continuation of U.S. application Ser. No. 15/207,638, filed Jul. 12, 2016, now U.S. Pat. No. 10,273,062, which is a Continuation of U.S. application Ser. No. 14/214,668, filed Mar. 15, 2014, now U.S. Pat. No. 9,394,086, which claims the benefit of U.S. Provisional Application No. 61/791,696, filed on Mar. 15, 2013, each of the above noted references is incorporated by reference herein.

BACKGROUND OF THE INVENTION

Multi-chambered containers having hinged lids are used in the sample testing industry. These lids can have a plurality of filling ports, typically one for each chamber of a container. This enables, inter alia, a simultaneous filling of each chamber of the container.

Often, such lids are molded out of a polymer material, and then secured to a container, e.g. by ultrasonic welding. The unique physical properties and user requirements for such multi-chambered lid apparatus has resulted in difficulties, both in the manufacture and use thereof. The instant invention addresses these and other concerns.

BRIEF SUMMARY OF THE INVENTION

Some embodiments of the invention provide an apparatus a top lid having a major opening, wherein the top lid includes a hinged end and a snap-fit end; and a bottom-cap hingedly attached to the top lid, the bottom-cap comprising an upper side and a lower side. The upper side may comprise a plateau upwardly extending from a lower surface of the upper side, wherein the plateau includes a plurality of passages. The lower side of the bottom-cap may comprise a lower side main surface, an outermost edge extending downward from the lower side main surface. A plurality of outermost edge alignment features may extend downward from the lower side main surface. A continuous outer welding ridge may extend downward from the lower side between the outermost edge and the alignment features. A plurality of walls can define separate cavities for each passage of the plurality of passages of the plateau. The plurality of walls can extend from a bottom surface of the plateau. An inner welding pattern can extend from ends of the walls and from the lower side main surface. The inner welding pattern may be patterned such that each cavity defined by the plurality of walls is surrounded by the inner welding pattern. In an open configuration the top lid is hinged away from the bottom-cap, and in a closed configuration the top lid is engaged with the bottom-cap. In the closed configuration, the snap-fit end of the top lid engages a snap portion of the outermost edge of the lower side of the bottom-cap and the plateau fits into the major opening of the top lid.

In some embodiments, a multi-chambered container can be connected to the bottom-cap, wherein corresponding edges of the multi-chambered container are welded to the outermost welding ridge and inner welding pattern such that each chamber of the multi-chambered container is fluidically sealed from one another at the connection between the multi-chambered container and the bottom-cap.

In some embodiments, the major opening of the top lid comprises a circular opening.

In some embodiments, the top lid comprises a first lateral side and a second lateral side extending between the hinged end and the snap-fit end.

In some embodiments, the hinged end of the top lid comprises a first hinge and a second hinge, each being medially displaced from the first and second lateral sides.

In some embodiments, the hinged end of the top lid comprises only a single hinge.

In some embodiments, the snap-fit end comprises a straight snap portion displaced off of a curved portion.

In some embodiments, the curved portion is cored out.

In some embodiments, the top lid comprises an upper-most top lid surface that is parallel with the plateau of the bottom-cap when in the closed configuration.

In some embodiments, the top lid comprises a cylindrical wall extending downward from the upper-most top lid surface, the cylindrical wall defining the major opening.

In some embodiments, the top lid comprises a bottom top lid surface opposite to the upper-most top lid surface, the cylindrical wall extending past the bottom top lid surface.

In some embodiments, the top lid includes a plurality of cylindrical walls extending from the bottom top lid surface.

In some embodiments, the plurality of passages of the plateau comprises a central opening surrounded by a plurality of circular openings.

In some embodiments, the plateau comprises a circular edge having a plurality of indents.

In some embodiments, the plateau comprises at least one trough extending between one passage of the plurality of passages and one indent of the plurality of indents.

In some embodiments, a film seal is applied to the top surface of the top lid.

In some embodiments, the lower surface of the upper side of the bottom cap includes at least one passage.

In some embodiments, the lower surface of the upper side of the bottom cap does not have any passages.

In some embodiments, the plurality of outermost edge alignment features on the lower side of the bottom-cap comprise curved walls extending away from the outermost edge.

In some embodiments, the plurality of walls on the lower side of the bottom cap defining separate cavities form a central cylindrical cavity and a plurality of petal shaped cavities extending from the central cylindrical cavity.

In some embodiments, the plurality of walls defining separate cavities further form a plurality of wedge shaped cavities.

In some embodiments, the plurality of walls defining separate cavities share a uniform wall thickness.

In some embodiments, the inner welding pattern (i.e., ridge or energy director) comprises a triangular cross-section.

In some embodiments, the continuous outer welding pattern (i.e., ridge or energy director) comprises a triangular cross-section.

Some embodiments of the invention provide an apparatus having a top lid having a plurality of openings, wherein the top lid includes a hinged end and a snap-fit end. A bottom-cap can be hingedly attached to the top lid. The bottom-cap can comprise an upper side and a lower side. The upper side can comprise a plurality of chimneys upwardly extending from a lower surface of the upper side. Each chimney can include a passage, wherein each chimney mates with a corresponding opening of the top lid. The lower side of the bottom-cap can comprise a lower side main surface. An outermost edge can extend downward from the lower side main surface. A plurality of outermost edge alignment features can extend downward from the lower side main surface. The alignment features can be in close vicinity to the outermost edge. A continuous outer welding ridge can extend downward from the lower side between the outermost edge and the alignment features. An inner welding pattern can extend from ends of the walls and from the lower side main surface, such that the inner welding pattern is not coextensive with any walls that extend from the lower side main surface. In an open configuration the top lid is hinged away from the bottom-cap, and in a closed configuration the top lid is engaged with the bottom-cap. In the closed configuration the snap-fit end of the top lid engages a snap portion of the outermost edge of the lower side of the bottom-cap.

Another aspect of the invention comprises a method for carrying out a reaction or an assay in a fluid container comprising a as disclosed herein.

In some embodiments, the method comprises lysis of a cell or microorganism.

In some embodiments, the method comprises preparation of a sample within a fluid cartridge to isolate or purify an analyte of interest.

In some embodiments, the method comprises detecting an analyte of interest.

In some embodiments, the analyte of interest is selected from the group consisting of cells, proteins, and nucleic acids.

In some embodiments, the method comprises the use of an enzyme or a binding moiety.

Another aspect of the invention comprises a method for filling a fluid container with liquid reagents, wherein the fluid container is mated with a lid as disclosed herein.

In some embodiments, the method involves filling one or more chambers of the fluid cartridge with a reagent.

DETAILED DESCRIPTION OF THE INVENTION

Figure 1A:
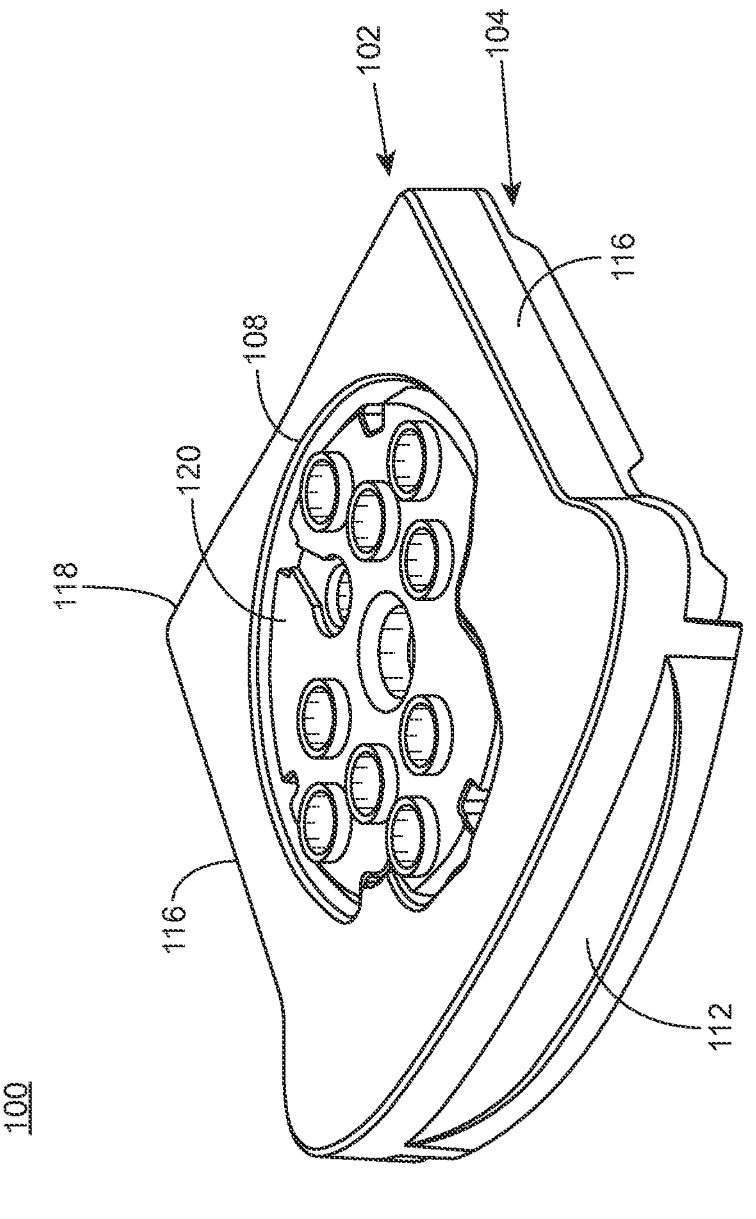
FIG. 1A shows a perspective view of a lid apparatus, according to some embodiments of the invention.

FIG. 1A shows a perspective view of a lid apparatus 100. The apparatus 100 includes a top lid 102 connected to a bottom-cap 104 by a hinge (not shown in this view). The top lid 102 has an upper surface 106 that defines a major opening 108, which is shown having a circular or crescent shape. The upper surface 106 also may define other openings, passages, and holes.

The top lid 102 includes a snap end 112 having features defining an overhanging feature that "snaps" over a portion of the bottom-cap 104. The snap-fit end 112 features a curvilinear profile leading to bulbous ends 114, which in turn lead to non-parallel sides 116. The non-parallel sides connect to a hinged-end 118, which has a straight profile. A plateau 120 extends upwardly from the bottom-cap 104. The upper surface 106 is coextensive with the plateau 120 when the top-lid 102 is closed shut.

Figure 1B:
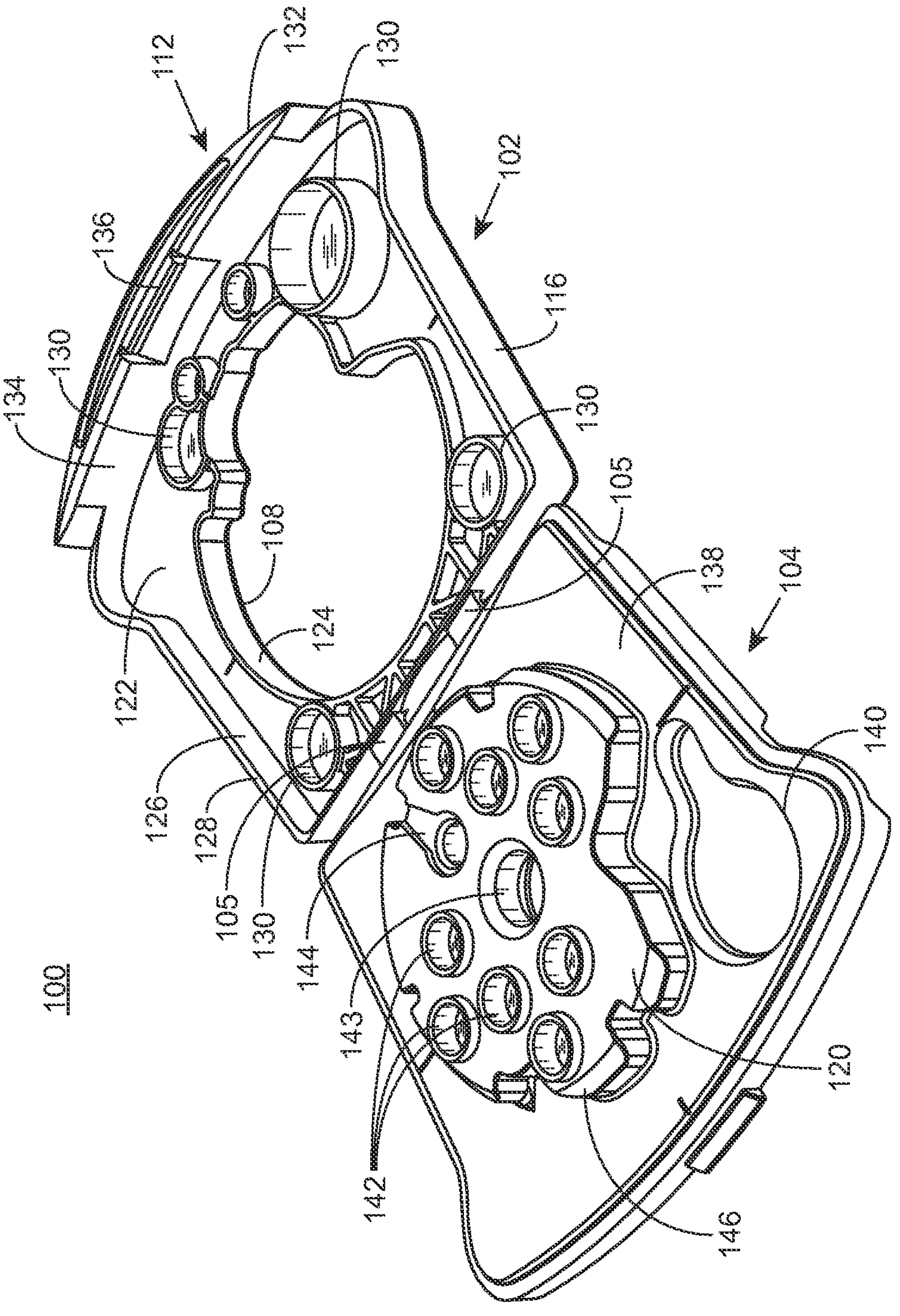
FIG. 1B shows the lid apparatus of FIG. 1A positioned according to an open configuration.

FIG. 1B shows the top-lid 102 and bottom-cap 104 spread apart in an open configuration, in which the top-lid 102 is hinged away from the bottom-cap 104 via hinges 105. A bottom-facing surface 122 of the top lid 102 is shown, from which a major cylindrical wall 124 of the major opening 108 extends. An inner wall surface 126 extends from and bounds a periphery of the bottom-facing surface 122. A bottom edge surface 128 sits atop the inner wall surface. A plurality of cylindrical walls 130 are positioned within the bounds of the inner-wall surface 126 to serve as fluid container caps.

The snap-fit end 112 extends downwardly with (and past) the inner-wall surface 126 from the bottom-facing surface 122. An outer-curved wall 132 and an inner-curved wall 134 define the crescent-like shape of the snap-fit end. A cavity 135 is cored out between the outer-curved wall 132 and the inner-curved wall 134 to help maintain a constant wall thickness throughout. The curvature of the inner-curved wall 134 is interrupted by a centrally located flex-tab 136. The flex-tab 136 has a straight edge for interfacing with a corresponding straight portion of the bottom-cap 104. Prior devices utilizing a curved tab edge have been found to be unsatisfactory in providing a sufficient snap-fit.

The plateau 120 extends from a lower surface 138 of the bottom-cap 104. The lower surface 138 can include one or more openings, such as filling hole 140, which can be shaped like a key-hole. The plateau 120 includes a plurality of passages 142. The passages are arranged in an orbital pattern about a central passage 143; however other arrangements are possible.

A trough 144 is formed within the plateau 120 between a chambered edge 146 and one of the passages. The trough 144 serves as a vent for the joined passage. While only one trough 144 is shown, each passage 142 can feature a trough.

A plurality of indents 148 are shown about the chambered edge 146 of the plateau 120. The indents 148 help maintain consistent wall thickness at intersections of walls beneath the plateau 120; such intersections would otherwise be relatively large nodes of material.

Figure 1C:
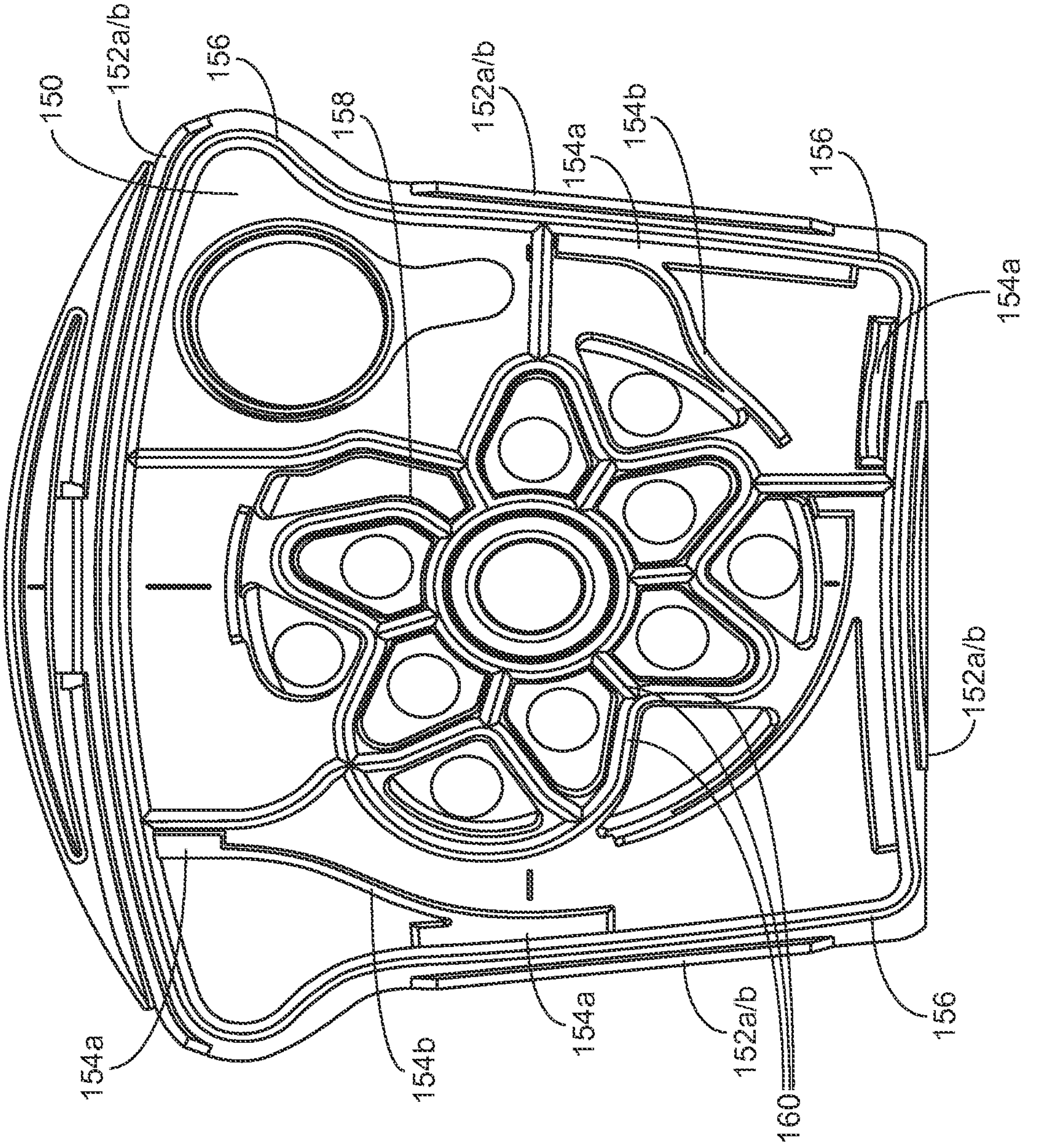
FIG. 1C shows a bottom view of the lid apparatus of FIG. 1A.

FIG. 1C shows a bottom view of the lower-side of bottom-cap 104, which includes a lower-side main surface 150. An outer-most edge 152*a* extends downward from the lower-side main surface 150 to form an outer-wall 152*b*. The outer-wall 152*b* is nearly continuous about the periphery of the bottom-cap 104, with interruptions occurring at two locations adjacent to the hinges (not shown in this view). Edge alignment features 154*a* are placed along each side of the lower-side main surface 150 and in close proximity to the outer wall 152*b*.

The edge alignment features 154*a* provide buttresses for aligning walls of a multi-chambered fluid container with the bottom-cap 104. A typical fluid container suitable for use with the cap can be seen in FIG. 2. Alignment walls 154*b* extend from, and in some cases in-between, the edge alignment features 154*a* to provide further engagement points against walls of a fluid container. A raised welding ridge 156 is continuous about the periphery of the bottom-cap 104, between the edge alignment features 154 and the outer wall 152*b*. When seated in a proper fashion, the edge alignment features 154*a* and alignment walls 154*b* prevent excessive rotation of the bottom-cap 104 against the fluid container, thus aligning the raised welding ridge 156 of the bottom-cap 104 with weldable features (e.g., edges of walls) of the bottom container.

A plurality of walls 158 extend from a central portion of the lower-side main surface 150. The walls are patterned in a flower petal-like arrangement, about a central cylinder. Here, the walls 158 are formed as six petals. A raised welding pattern 160 is present on the top edges of the walls 158. The raised welding pattern 160 connects to the welding ridge 156. In this manner, four fluidic zones are created outside the petals. When a fluid container and the bottom-cap 104 are welded via the raised welding pattern 160 and welding ridge 156, sub-containers within the bottom container are fluidly isolated from one another (at least at the interface between the fluid container and the bottom-cap 104).

Figure 1D:
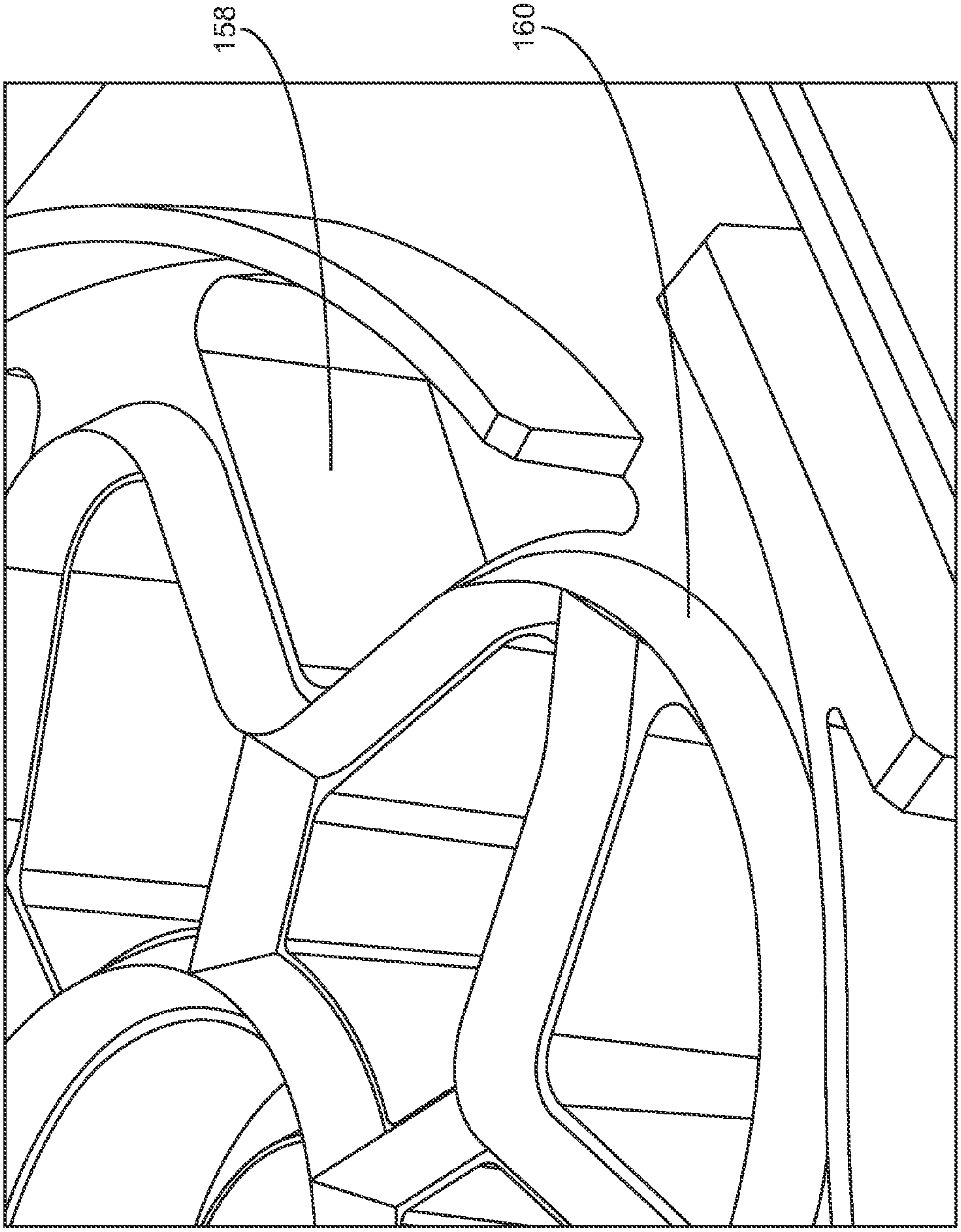
FIG. 1D shows a close-up view of a lid apparatus of FIG. 1A.

FIG. 1D shows a close-up view of the raised welding pattern 160, which has a triangular cross-section. This shape acts as a "energy director" when ultrasonic energy is applied to the apparatus 100 in order to weld the raised welding pattern 160 (and likewise the raised welding ridge 156, which is shaped in the same manner) to a container. The apparatus 100 features uniform wall thickness throughout, except for the raised welding pattern 160 and raised welding ridge 156, which are both triangular. Thus, energy is preferentially directed to the tips of the triangles, which are in contact with edges of the container, resulting in the fusion of the triangular raised welding pattern 160 and raised welding ridge 156 to walls of the container.

Figure 2:
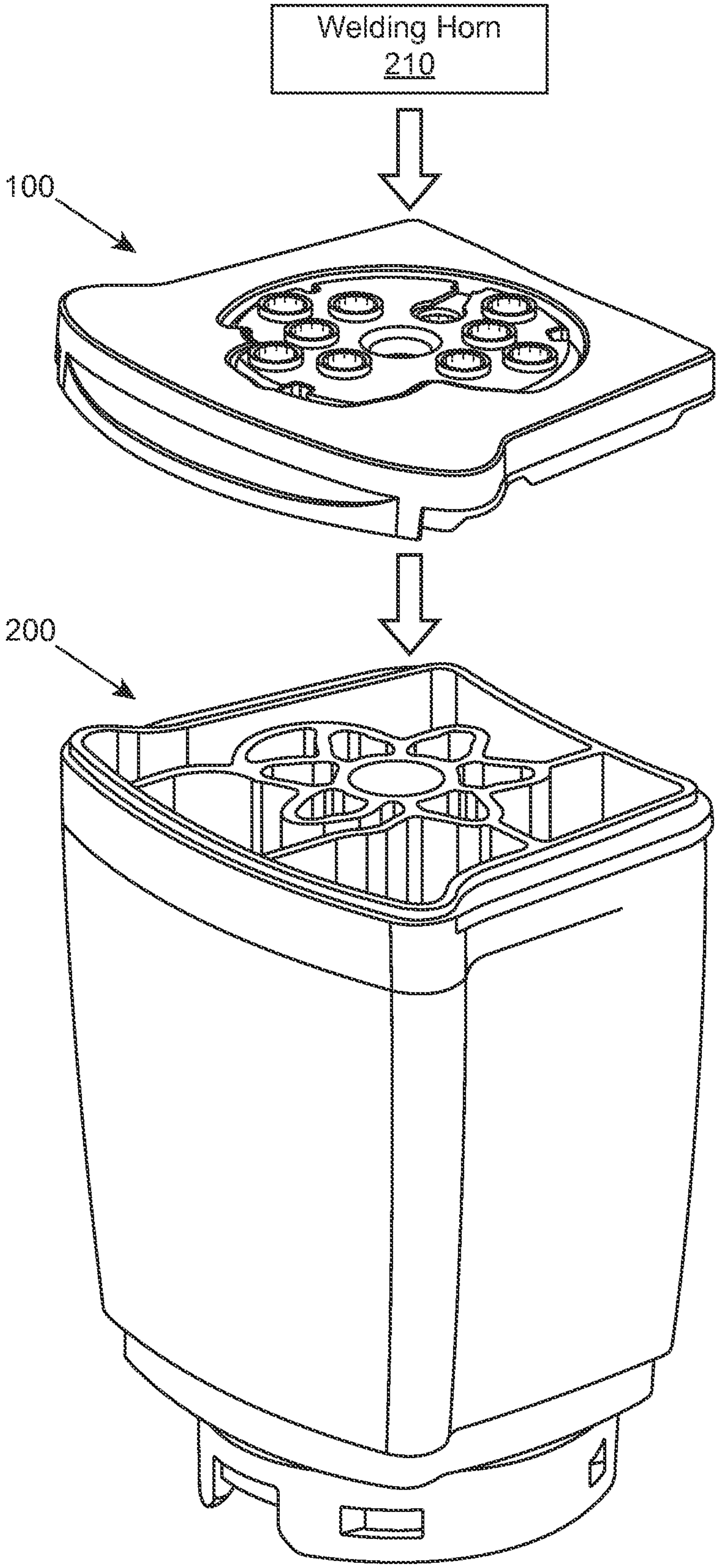
FIG. 2 shows a lid apparatus assembling process, according to some embodiments of the invention.

FIG. 2 shows the lid apparatus 100 in relation to a fluid container 200. The container 200 contains a plurality of chambers that can be fluidly coupled or non-coupled according to the position of an internal valve assembly. The chambers are defined by walls that extend to the top of the container 200. The fused interface between the lid apparatus 100 and the fluid container 200 is created such that the chambers are sealed off from one another by way of a welded interface between the raised welding pattern 160 and welding ridge 156 and the chambers of the container 200.

The lid apparatus 100 can be welded to the fluid container by way of an ultrasonic welding horn that interfaces with the plateau 120 while the apparatus is seated on the container 200. The welding horn 210 generally comprises a metal cylinder shaped to interface against and around the plateau. The welding horn 210 is part of a greater welding apparatus (not shown) which provides energy to the welding horn 210. A commercially available ultrasonic welding apparatus is available from manufactures such as Hermann Ultrasonics, Bartlett, IL 60103 or Branson Ultrasonics, a division of Emerson Industrial Automation, Eden Prairie, MN 55344, can be used in this process. In some embodiments, the lid apparatus is secured to the fluid container using gaskets or adhesives well known to persons of skill in the art.

The lid apparatus 100 and container can be constructed out of any suitable material, including but not limited to metals, ceramics, and/or plastics. Suitable plastics can include thermal plastics, such as polypropylene, which is a suitable material for handling biological specimens, but not possess optimal welding characteristics. The lid apparatus 100 overcomes this by having nearly uniform wall thickness throughout the bottom-cap 104, which enables the apparatus 100 to be welded to the container using relatively low power of 150 J, versus prior designs which required 350-500 J. Tests have shown that a good weld penetration depth (13-29 thousandths) occurs despite the lower power setting. Other suitable polymers that can be used include but are not limited to polyester, polyethylene, polyimide, ABS, polycarbonate, and the like.

In some embodiments, to weld the lid apparatus 100 to the fluid container 200, the bottom-cap 104 is first brought into contact with the fluid container 200. The edge alignment features 154*a* and alignment walls 154*b* prevent excessive rotation of the bottom-cap 104 against the fluid container 200, thus aligning the raised welding pattern 160 and raised welding ridge 156 of the bottom-cap 104 with edges of the fluid container 200. After the lid apparatus 100 is properly seated, the welding horn 210 is lowered until it contacts the plateau 120. 150 J of energy is then applied to the welding horn for [time] seconds, resulting in a welded lid assembly.

The triangular shapes of the raised welding pattern 160 and welding ridge 156 cause energy to be preferentially directed from upper surfaces about the plateau 120 to the raised welding pattern 160 and welding ridge 156, and thereby fuse the raised welding pattern 160 and welding ridge 156 with the fluid container 200. The resulting weld is fluid-tight, such the chambers of the fluid container 200 are fluidically sealed from one another at the connection between the fluid container 200 and the bottom-cap 104 (under pressurized conditions).

Figure 3:
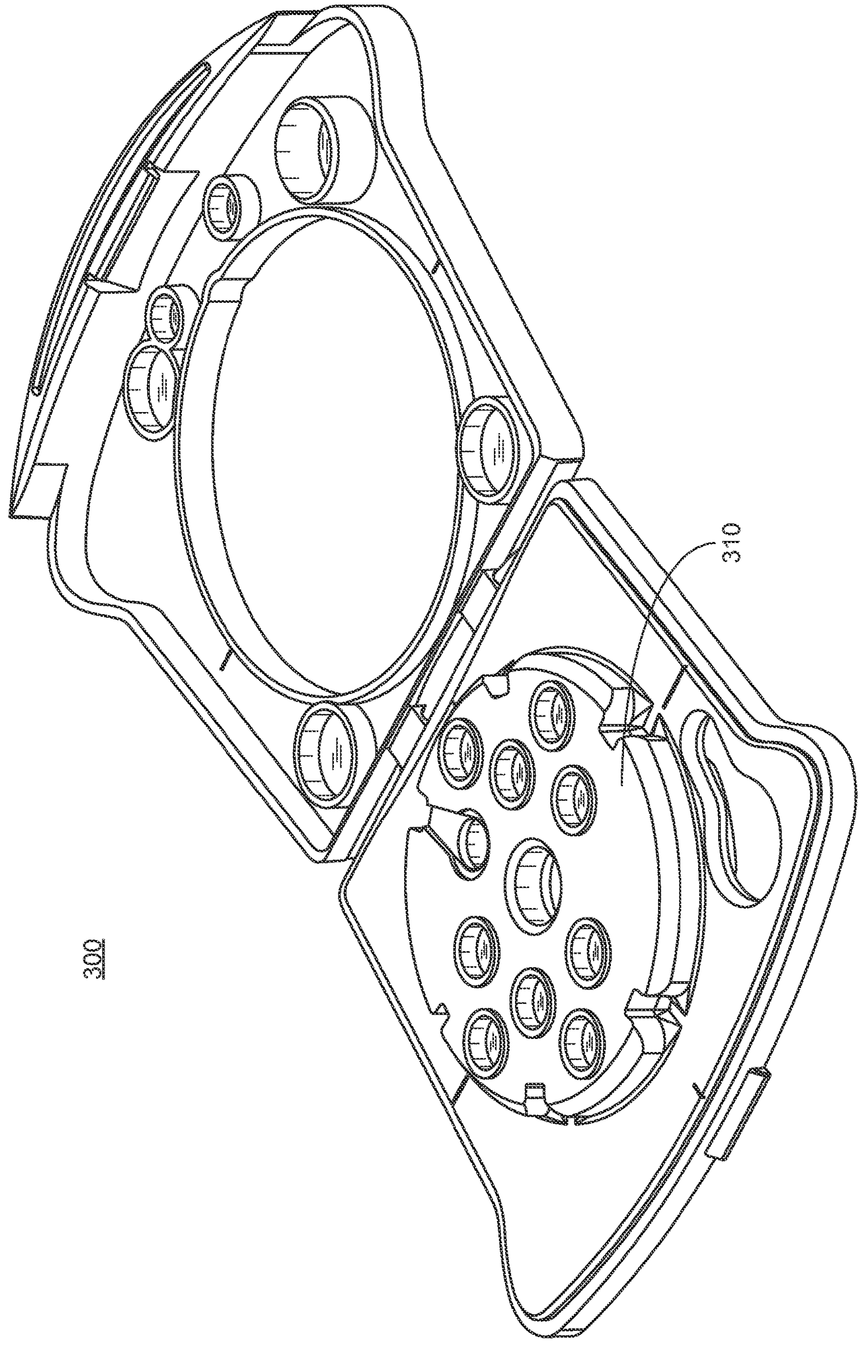
FIG. 3 shows a perspective view of a lid apparatus, according to some embodiments of the invention.

FIG. 3 shows a lid apparatus 300 according to an alternative embodiment of the invention. The lid apparatus 300 is substantially similar to the lid apparatus 100; however, the lid apparatus 300 includes a plateau 310 that has a circular shape, instead of a crescent shape per the plateau 120 of lid apparatus 100. However, other shapes can be used, such square or hexagonal shapes. Indeed, it should be understood that embodiments of the invention are not limited to circular and crescent-shaped plateaus.

Figure 4A:
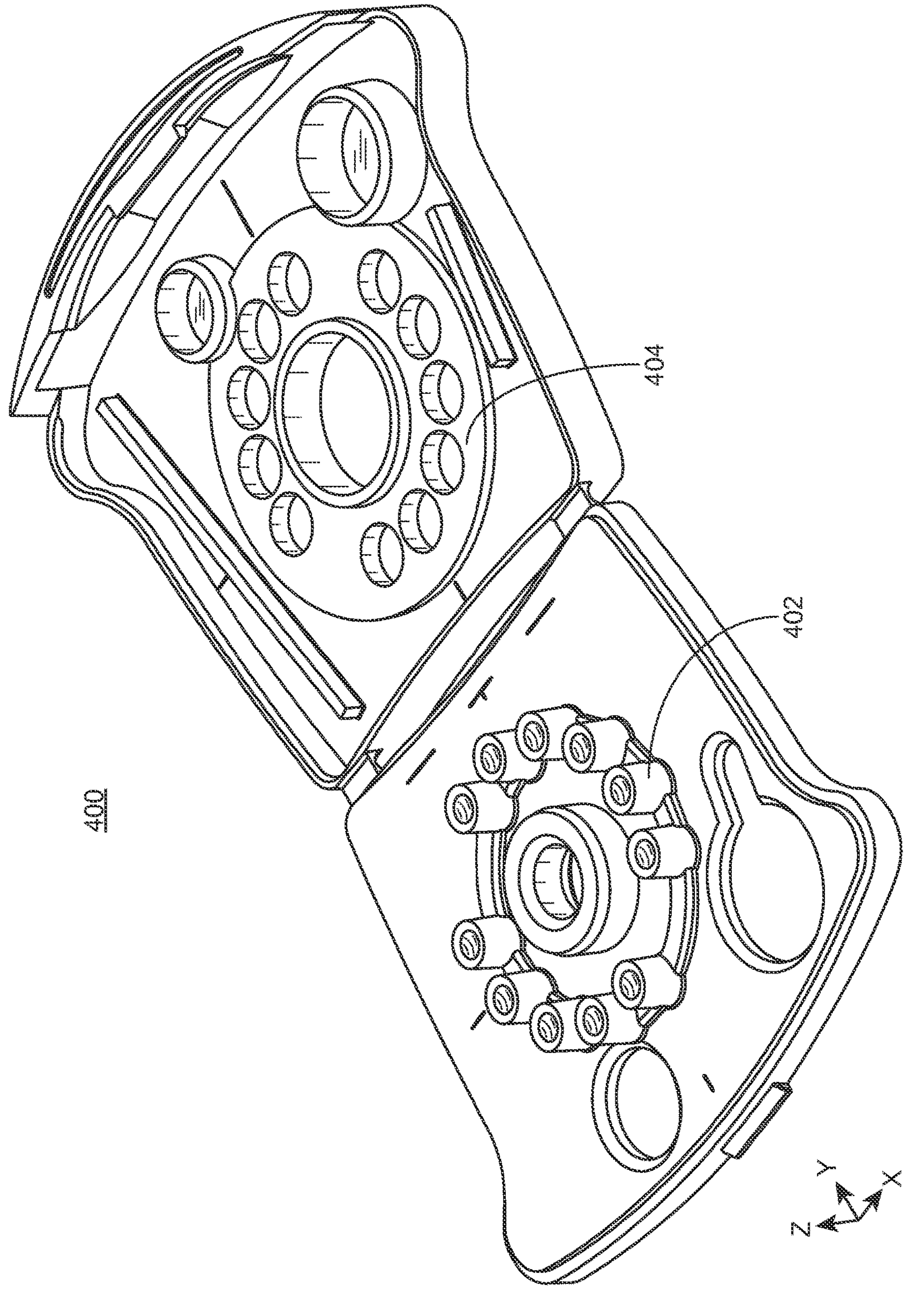
FIGS. 4A and 4B show different perspective views of a lid apparatus, according to some embodiments of the invention.
Figure 4B:
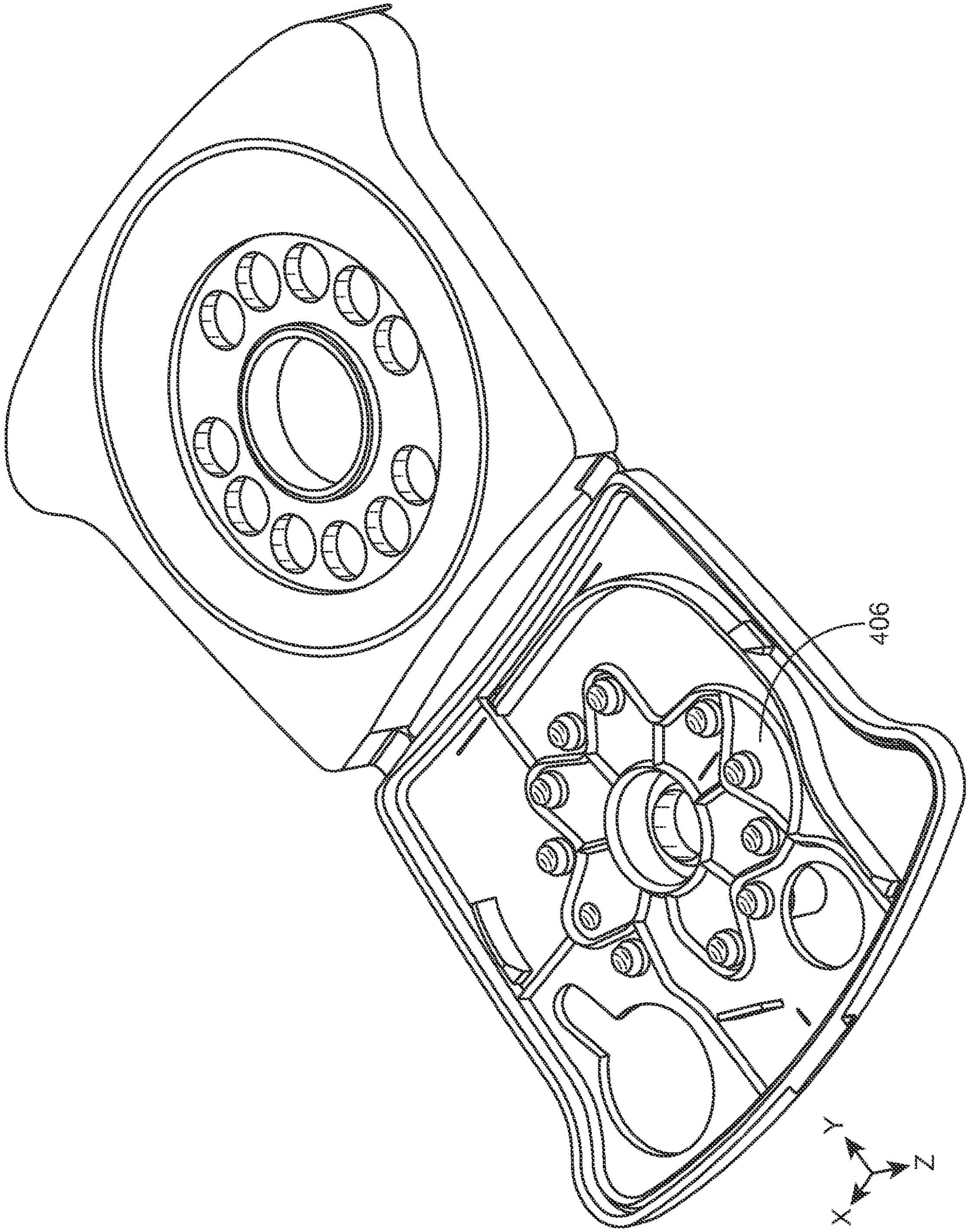

FIGS. 4A and 4B shows a lid apparatus 400 according to an alternative embodiment of the invention. The lid apparatus 400 is substantially similar to the lid apparatus 100. However, the lid apparatus 400 does not include a plateau 120, but rather a plurality of chimneys 402 (with passages) that protrude into openings 404 in the top lid. Accordingly, the lid apparatus 400 includes a substantially uniform bottom-surface 406, and thus the shown inner welding pattern is not coextensive with any walls that extend from the bottom-surface 406.

The chambers of the fluid container apparatus disclosed herein can contain one or more reagents for a variety of purposes. These reagents maybe present in a variety of forms. Non-limiting exemplary reagent forms can include a solution, a dry powder, or a lyophilized bead. The reagents may be intended for different purposes including but not limited to chemical and/or enzymatic reactions, sample preparation, and/or detection. Non-limiting exemplary purposes can include lysis of cells or microorganisms, purification or isolation of an analyte of interest (e.g., a specific cell population, a nucleic acid or a protein), digestion or modification of nucleic acids or proteins, amplification of nucleic acids, and/or detection of an analyte of interest.

In some embodiments, the reagent present in a chamber of the apparatus may be a lysis agent (such as a detergent) that can cause the disintegration of cellular membrane, thereby releasing the cellular nucleic acids and proteins for further processing. Lysis agents are formulated differently for effectively lysing specific organisms such as eukaryotic cells, prokaryotic cells, plant cells, viruses, spores, etc.

The reagent in some embodiments may be an antibody, nucleic acid, or other moiety that specifically binds a predetermined molecule (e.g., a cell surface antigen, a specific protein, or a particular nucleic acid sequence that is the intended detection target) and is used for the purpose of separating, purifying, or detecting the pertinent molecule or cells bearing the molecule. Optionally the reagent with desired binding affinity is immobilized on a solid substrate within the chamber. While an antibody or other reagent moiety may be stably stored in a solution under certain conditions, often it is lyophilized or freeze-dried for better stability.

In some embodiments, the reagent may be an enzyme that is capable of digesting a target molecule (e.g., a protein or nucleic acid), such that further analysis can be conducted. Many known proteases and nucleases are commercially available and can be chosen for use in the apparatus of this invention. In other cases, the reagent is an enzyme for a nucleic acid amplification reaction, such as a DNA polymerase for a polymerase chain reaction (PCR), or a reverse transcriptase for a reverse transcription polymerase chain reaction (RT-PCR). Like an antibody, an enzyme may be maintained in a solution but is often kept in lyophilized or dried form in the apparatus of this invention for stability reasons. Typically along with the enzyme, other necessary components of the enzymatic reaction such as ingredients of the reaction buffer, free deoxyribonucleotides, primers, are also present in the same or a different chamber, so that the desired reaction can be constituted quickly when needed.

In some embodiments, the reagent contains necessary ingredients for a chemical reaction, for example, one that is capable of generating a detectable signal (e.g., optical signal) for the detection of a particular target analyte. Aside from the components of an appropriate reaction buffer, at least one agent that is responsible for producing the detectable signal is typically included.

Although the above description contains many specificities, these should not be construed as limitations on the scope of the invention, but merely as illustrations of some of the presently preferred embodiments. Many possible variations and modifications to the invention will be apparent to one skilled in the art upon consideration of this disclosure.

What is claimed is:

1. A lid apparatus for sealing atop a fluid sample container, the lid apparatus comprising:
- a top lid having a major opening and a plurality of openings disposed about the major opening, wherein the top lid includes a hinged end and a snap-fit end; and
- a bottom-cap hingedly attached to the top lid, the bottom-cap comprising an upper side and a lower side, wherein the upper side comprises a plurality of openings that include a surrounding lip or plateau that protrudes from the upper side, wherein each of the plurality of openings defines a through passage such that the plurality of openings correspond to a plurality of passages,
- wherein the lower side of the bottom-cap comprises:
  - a lower side main surface;
  - an outermost edge extending downward from the lower side main surface; and
  - a continuous outer ridge extending downward from the lower side along the outermost edge for sealingly securing to the fluid sample container.

2. The lid apparatus of claim 1, further comprising:
- a multi-chambered fluid sample container connected to the bottom-cap, wherein a continuous outer top edge of the multi-chambered fluid sample container is sealingly secured to the outermost ridge by a gasket or an adhesive.

3. The lid apparatus of claim 1, wherein in an open configuration the top lid is hinged away from the bottom-cap, and wherein in a closed configuration the top lid is engaged with the bottom-cap, wherein in the closed configuration the snap-fit end of the top lid engages a snap portion of the outermost edge of the lower side of the bottom-cap and the plurality of openings align with the plurality of openings in the top lid.

4. The lid apparatus of claim 1, further comprising an inner ridge pattern extending from the lower side main surface, the inner ridge pattern being patterned such that the inner ridge pattern extends adjacent the plurality of passages in the lower side main surface.

5. The lid apparatus of claim 4, further comprising:
- a multi-chambered fluid sample container connected to the bottom-cap, wherein corresponding edges of the multi-chambered fluid sample container are sealingly secured to the outermost ridge and inner ridge pattern such that the chambers of the multi-chambered fluid sample container are fluidically sealed from one another at the connection between the multi-chambered fluid sample container and the bottom-cap.

6. The lid apparatus of claim 5, wherein the continuous outer ridge and the inner ridge pattern are sealingly secured to the corresponding edges of the multi-chambered fluid sample container by a gasket or an adhesive.

7. The lid apparatus of claim 1, wherein the major opening of the top lid comprises a circular opening.

8. The lid apparatus of claim 1, wherein the top lid comprises a first lateral side and a second lateral side extending between the hinged end and the snap-fit end.

9. The lid apparatus of claim 8, wherein the hinged end of the top lid comprises a first hinge and a second hinge, each being laterally displaced from the first and second lateral sides.

10. The lid apparatus of claim 1, wherein the snap-fit end is displaced off of a curved portion.

11. The lid apparatus of claim 1, wherein the top lid comprises an annular recess surrounding the major opening, the plurality of opening being defined within the annular recess.

12. The lid apparatus of claim 11, wherein the top lid comprises a cylindrical wall extending downward from an upper-most top lid surface, the cylindrical wall defining the major opening.

13. The lid apparatus of claim 12, wherein the top lid comprises a bottom top lid surface opposite to the upper-most top lid surface, the cylindrical wall extending past the bottom top lid surface.

14. The lid apparatus of claim 13, wherein the top lid includes a plurality of cylindrical walls extending from the bottom top lid surface.

15. The lid apparatus of claim 1, wherein the bottom-cap further comprises a central opening surrounded by the plurality of openings.

16. The lid apparatus of claim 1, wherein each of the plurality of openings is circular.

17. The lid apparatus of claim 1, wherein the upper side of the bottom-cap includes at least one additional passage separate from the plurality of passages that is larger than each of the plurality of passages.

18. The lid apparatus of claim 1, wherein the outermost edge comprises an edge alignment feature.

19. The lid apparatus of claim 1, further comprising:
- a plurality of walls defining separate cavities for each opening of the plurality of passages of the bottom-cap, the plurality of walls extending from the lower side main surface of the bottom-cap.

20. The lid apparatus of claim 19, wherein the plurality of walls defining separate cavities further form a plurality of wedge shaped cavities.

21. The lid apparatus of claim 1, wherein the bottom-cap includes an additional hole that is separate from the plurality of openings and has a key-hole shape.

22. The lid apparatus of claim 1, wherein the lid apparatus is constructed of plastic and/or metal.

23. A lid apparatus for sealing atop a fluid sample container, the lid apparatus comprising:

a top lid having a plurality of openings, wherein the top lid includes a hinged end and a snap-fit end; and a bottom-cap hingedly attached to the top lid, the bottom-cap comprising an upper side and a lower side, wherein the upper side comprises a plurality of openings that include a surrounding lip or plateau that extends upwardly from a lower surface of the upper side, wherein each opening aligns with a corresponding opening of the top lid, wherein the lower side of the bottom-cap comprises:

a lower side main surface;

an outermost edge extending downward from the lower side main surface;

a continuous outer ridge extending downward from the lower side along the outermost edge; and an inner ridge pattern extending from the lower side main surface, the inner ridge pattern being non-coextensive with any walls that extend from the lower side main surface, wherein in an open configuration the top lid is hinged away from the bottom-cap, and wherein in a closed configuration the top lid is engaged with the bottom-cap, wherein in the closed configuration the snap-fit end of the top lid engages a snap portion of the outermost edge of the lower side of the bottom-cap.

24. The lid apparatus of claim 23, wherein the continuous outer ridge and the inner ridge pattern are sealingly secured to the corresponding edges of a multi-chambered fluid sample container by a gasket or an adhesive.

25. The lid apparatus of claim 23, wherein the lid apparatus is constructed of plastic and/or metal.

* * * * *